(12) United States Patent
Salter et al.

(10) Patent No.: US 9,771,019 B2
(45) Date of Patent: Sep. 26, 2017

(54) PHOTOLUMINESCENT VEHICLE ILLUMINATION

(71) Applicant: Ford Global Technologies, LLC, Dearborn, MI (US)

(72) Inventors: Stuart C. Salter, White Lake, MI (US); Michael James Whitens, Milford, MI (US); Paul Kenneth Dellock, Ann Arbor, MI (US); James J. Surman, Clinton Township, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 275 days.

(21) Appl. No.: 14/639,339

(22) Filed: Mar. 5, 2015

(65) Prior Publication Data

US 2015/0175057 A1    Jun. 25, 2015

Related U.S. Application Data

(63) Continuation-in-part of application No. 14/086,442, filed on Nov. 21, 2013.

(51) Int. Cl.
| | |
|---|---|
| *B60Q 1/26* | (2006.01) |
| *B60R 1/12* | (2006.01) |
| *B60Q 1/32* | (2006.01) |
| *F21S 8/10* | (2006.01) |

(52) U.S. Cl.
CPC ............ *B60Q 1/32* (2013.01); *B60Q 1/326* (2013.01); *F21S 48/214* (2013.01)

(58) Field of Classification Search
CPC ........ B60Q 1/2665; B60Q 1/32; B60Q 1/323; B60Q 1/326; F21S 48/214–48/215

USPC ............... 362/487, 494, 501, 509–510
See application file for complete search history.

(56) References Cited

U.S. PATENT DOCUMENTS

| | | |
|---|---|---|
| 5,053,930 A | 10/1991 | Benavides |
| 5,709,453 A | 1/1998 | Krent et al. |
| 5,839,718 A | 11/1998 | Hase et al. |
| 5,871,275 A | 2/1999 | O'Farrell et al. |
| 6,031,511 A | 2/2000 | DeLuca et al. |
| 6,117,362 A | 9/2000 | Yen et al. |
| 6,419,854 B1 | 7/2002 | Yocom et al. |

(Continued)

FOREIGN PATENT DOCUMENTS

| | | |
|---|---|---|
| CA | 2466248 A1 | 7/2003 |
| CN | 2663217 Y | 12/2004 |

(Continued)

OTHER PUBLICATIONS

"Puddle Light Retrofit to Door Mirror," myturbodiesel.com, 2013.

(Continued)

*Primary Examiner* — Jason Moon Han
(74) *Attorney, Agent, or Firm* — Jason Rogers; Price Heneveld, LLP

(57) ABSTRACT

An illumination apparatus for a vehicle is disclosed. The illumination apparatus comprises at least one light source disposed in a portion of a side mirror assembly of the vehicle. The light source is configured to emit an excitation emission at a first wavelength substantially along a side portion of the vehicle. The illumination apparatus further comprises a photoluminescent portion disposed on a surface of the vehicle. The excitation emission is configured to excite the photoluminescent portion to emit an output emission corresponding to a different color of light than the first excitation emission.

7 Claims, 5 Drawing Sheets

(56) References Cited

U.S. PATENT DOCUMENTS

| | | |
|---|---|---|
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller et al. |
| 6,871,986 B2 | 3/2005 | Yamanaka et al. |
| 6,926,431 B1 | 8/2005 | Foote et al. |
| 6,926,972 B2 | 8/2005 | Jakobi et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,491,170 B2 | 7/2013 | Rodriguez Barros |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,696,179 B2 | 4/2014 | Pastrick |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201169230 Y | 12/2008 |
| CN | 101337492 A | 1/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

OTHER PUBLICATIONS

"Side Blind Zone," Automotive Products, 2014, Gentex Corporation.

"Exterior Auto-Dimming Mirrors with Approach Light," 2013, Subaru of America Inc.

PHOTOLUMINESCENT VEHICLE ILLUMINATION

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The illumination apparatus comprises at least one light source disposed in a portion of a side mirror assembly of the vehicle. The light source is configured to emit an excitation emission at a first wavelength substantially along a side portion of the vehicle. The illumination apparatus further comprises a photoluminescent portion disposed on a surface of the vehicle. The excitation emission is configured to excite the photoluminescent portion to emit an output emission corresponding to a different color of light than the first excitation emission.

According to another aspect of the present invention, an illumination apparatus for a vehicle is disclosed. The illumination apparatus comprises at least one light source disposed in a portion of a side mirror assembly. The light source is configured to emit at least one excitation emission at a first wavelength substantially along a side portion of the vehicle in response to a door ajar condition. The illumination apparatus further comprises a photoluminescent portion disposed on at least one exterior door surface of the vehicle. The excitation emission is configured to excite the photoluminescent portion to emit an output emission corresponding to a different color of light than the first excitation emission.

According to yet another aspect of the present invention, an illumination apparatus for a vehicle is disclosed. The illumination apparatus comprises at least one light source disposed in a portion of a side mirror assembly. The light source is configured to emit an excitation emission at a first wavelength substantially along a side portion of the vehicle. The illumination apparatus further comprises a photoluminescent portion disposed on an exterior surface of the vehicle and a controller. The controller is configured to selectively activate the excitation emission in response to a proximity detection. The first excitation emission is configured to excite the photoluminescent portion to emit an output emission corresponding to a different color of light than the first excitation emission.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
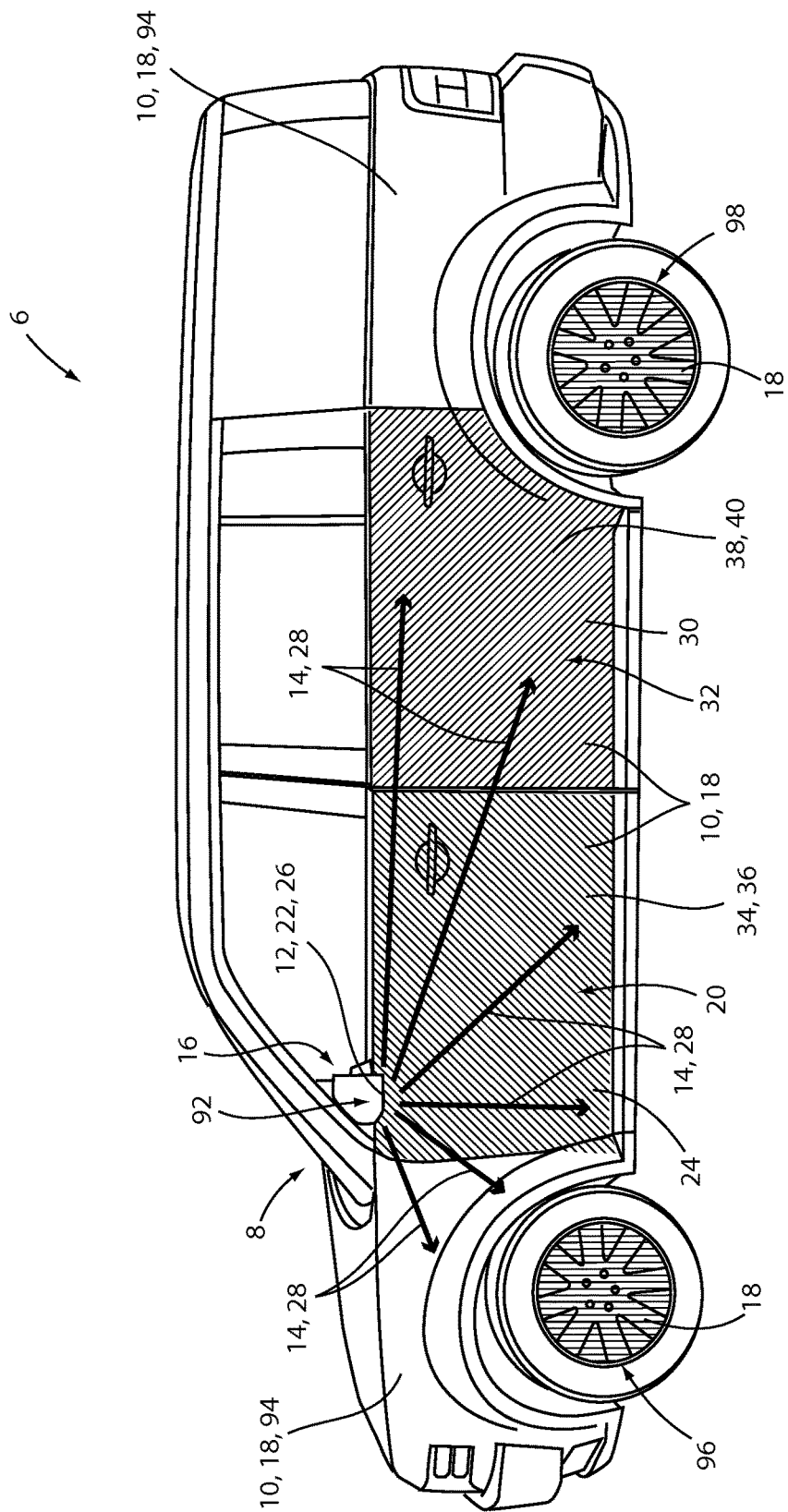
FIG. 1 is a side view of a vehicle comprising a lighting system configured to illuminate at least a portion of a panel of the vehicle.

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure which may be combined in various combinations and/or individually utilized to clearly reference various elements of the disclosure.

The following disclosure describes a lighting system for a vehicle configured to illuminate a first photoluminescent portion of at least one vehicle panel having a first luminescent absorption range. The lighting system comprises a light source having at least one emitter. The emitter is configured to emit an excitation emission or a first excitation emission of light having a first wavelength corresponding to a luminescent absorption range of the photoluminescent portion. In response to receiving the excitation emission, the first photoluminescent portion is configured to emit an output emission or a first output emission. The output emission has a second wavelength that differs from the first wavelength in that the second wavelength is longer and more acutely visible to the human eye. In this configuration, the lighting system provides for illumination of the first photoluminescent portion from the first emitter.

In some implementations, the lighting system further includes a second emitter and a second photoluminescent portion having a second luminescent absorption range. The second emitter is configured to emit a second excitation emission having a third wavelength corresponding to the second photoluminescent portion. In response to receiving the second excitation emission, the second photoluminescent portion is configured to emit a second output emission. The lighting system is may selectively illuminate the first photoluminescent portion and/or the second photoluminescent portion in response to a door ajar condition, a blind spot detection, and/or various vehicle states.

Referring to FIG. 1, a side view of a vehicle 6 comprising a lighting system 8 configured to illuminate at least a portion of a panel 10 of the vehicle 6 is shown. The lighting system 8 comprises at least one light source 12 configured to emit a first excitation emission 14 having a first wavelength. The light source 12 is shown disposed in a housing of a side mirror assembly 16. In this configuration, the light source 12 is operable to output excitation emissions substantially along a longitudinal dimension of the vehicle 6. As discussed herein, the longitudinal dimension corresponds to a dimension extending from a forward portion of the vehicle 6 to a rearward portion of the vehicle 6 relative to a direction of operation of the vehicle 6. The excitation emissions may be emitted along an exterior surface of one or more panels corresponding to a side portion of the vehicle.

The lighting system 8 further comprises at least one photoluminescent portion 18 configured to emit a first output emission 20 having a second wavelength. The first output emission 20 causes the at least one photoluminescent portion 18 to have an ambient glow having a color corresponding to one or more wavelengths corresponding to the second wavelength. The at least one photoluminescent portion 18 may comprise at least one photoluminescent structure that is excited in response to receiving the first excitation emission 14 and converts the first wavelength to the second wavelength to illuminate the at least one photoluminescent portion 18.

The at least one photoluminescent portion 18 may correspond to a plurality of photoluminescent portions. Similarly, the at least one light source 12 may comprise a plurality of emitters. In some implementations, each of the plurality of light emitters is configured to correspond to each of the photoluminescent portions to illuminate a corresponding photoluminescent portion. For example, a first emitter 22 may correspond to a first photoluminescent portion 24. The first emitter 22 may be configured to emit the first excitation emission 14 such that the first photoluminescent portion 24 becomes excited and converts the first excitation emission 14 to the first output emission 20 having a second wavelength.

In some embodiments, the light source 12 may comprise a second emitter 26. The second emitter 26 may be configured to emit a second excitation emission 28 corresponding to a second photoluminescent portion 30. The second emitter 26 may correspond to one or more of the plurality of light emitters corresponding to the light source 12. The second photoluminescent portion 30 may correspond to one of the plurality of photoluminescent portions demonstrated in FIG. 1 as the at least one photoluminescent portion 18. In response to receiving the second excitation emission 28, the second photoluminescent portion 30 is configured to output a second output emission 32 corresponding to a fourth wavelength of light. In this configuration, the lighting system 8 may be operable to selectively illuminate each of the first photoluminescent portion 24 and the second photoluminescent portion 30 substantially independently.

The first photoluminescent portion 24 may be applied to a portion of a first exterior surface 34 of a first passenger door 36 and the second photoluminescent portion 30 may be applied to a portion of a second exterior surface 38 of second passenger door 40. The first passenger door 36 may correspond to a forward passenger door and the second passenger door 40 may correspond to a rear passenger door. In this configuration, the lighting system 8 may be operable to illuminate a portion of the first passenger door 36 or the second passenger door 40 in response to either of the doors being detected as being ajar. The disclosure may provide for additional embodiments which may generally provide for the at least one light source 12 to illuminate at least a portion an exterior portion of the vehicle based on various vehicle states and/or the identification of a warning condition of the vehicle 6.

Figure 2A:
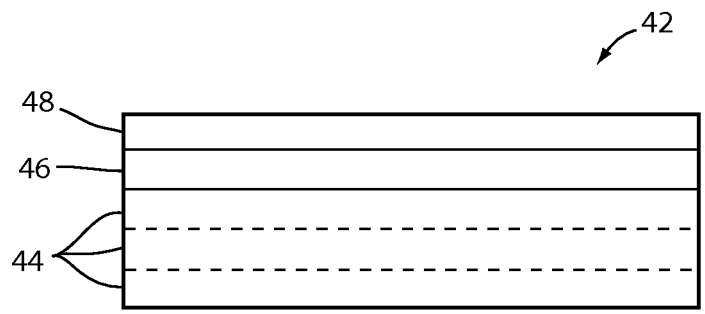
FIG. 2A is a detailed view of a photoluminescent structure rendered as a coating.
Figure 2B:
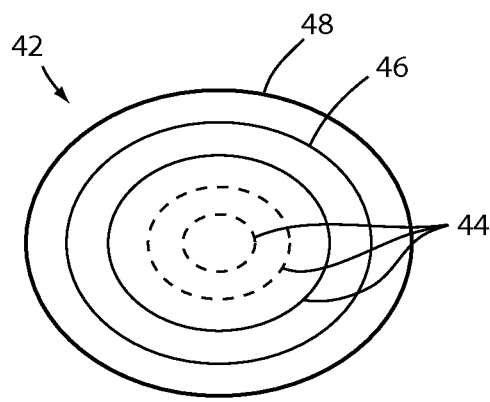
FIG. 2B is a detailed view of a photoluminescent structure rendered as a discrete particle.
Figure 2C:
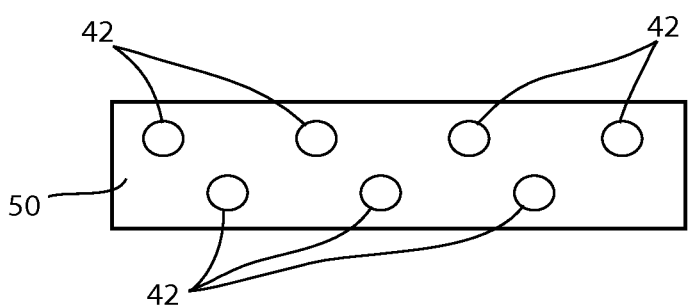
FIG. 2C is a detailed view of a plurality of photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle panel, a discrete particle capable of being implanted in a surface of a vehicle panel, and a plurality of discrete particles incorporated into a separate structure capable of being applied to a vehicle panel, respectively. The photoluminescent structure 42 may correspond to the photoluminescent portions as discussed herein, for example the first photoluminescent portion 24 and the second photoluminescent portion 30. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle panel. The energy conversion layer 44 coating may be deposited on a surface of vehicle panel by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multilayered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be co-extruded to prepare an integrated multilayered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture and/or panel.

In some implementations, the photoluminescent structure 42 may be incorporated into a vehicle panel as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 3:
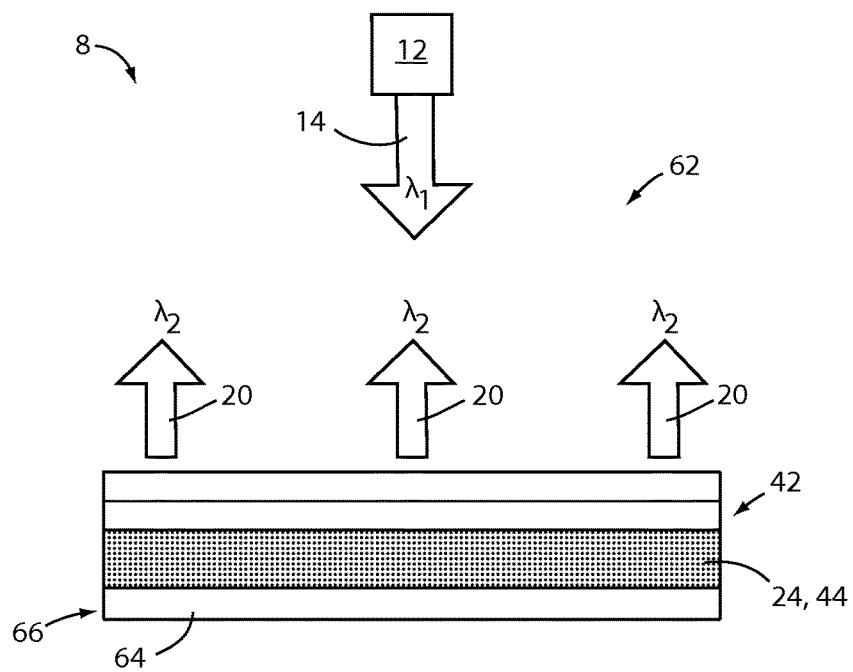
FIG. 3 is a side schematic view of a lighting system configured to convert an excitation emission of light to an output emission of light.

Referring to FIG. 3, the lighting system 8 is generally shown according to a front-lit configuration 62 to convert the first excitation emission 14 from the at least one light source 12 to the first output emission 20. The first excitation emission 14 comprises a first wavelength $\lambda_1$, and the first output emission 20 comprises a second wavelength $\lambda_2$. The lighting system 8 may include the photoluminescent structure 42 rendered as a coating and applied to a substrate 64 or surface of a vehicle panel 66. The photoluminescent structure 42 may include the energy conversion layer 44, and in some implementations may include the stability layer 46 and/or protective layer 48. In response to the at least one light source 12 being activated, the first excitation emission 14 is converted from the first wavelength $\lambda_1$ to the first output emission 20 having at least the second wavelength $\lambda_2$. The first output emission 20 may comprise a plurality of wavelengths configured to emit any of a variety of colors of light from the vehicle panel 66.

In various implementations, the lighting system 8 comprises at least one energy conversion layer 44 configured to convert the first excitation emission 14 at the first wavelength $\lambda_1$ to the first output emission 20 having at least the second wavelength $\lambda_2$. The at least one energy conversion layer 44 may be configured to generate a variety of visible colors by utilizing at least one of a red-emitting photoluminescent material, a green-emitting photoluminescent material, and a blue-emitting photoluminescent material which may be applied to at least a portion of a surface of the vehicle 6 to form the at least one photoluminescent portion 18. The red, green, and blue-emitting photoluminescent materials may be combined to generate one of variety of colors for the first output emission 20. Further, the red, green, and blue-emitting photoluminescent materials may be utilized in a variety of proportions and combinations to control the color of the first output emission 20.

Each of the photoluminescent materials may vary in output intensity, output wavelength, and peak absorption wavelengths based on a particular photochemical structure and combinations of photochemical structures utilized in the energy conversion layer 44. An intensity of the first output emission 20 may be changed by adjusting the wavelength of the first excitation emission 14. In addition to or in alternative to the red, green, and blue-emitting photoluminescent materials, other photoluminescent materials may be utilized alone and in various combinations to generate the first output emission 20 in a wide variety of colors. In this way, the lighting system 8 may be configured for a variety of applications to provide a desired lighting color and effect for the vehicle 6.

Figure 4:
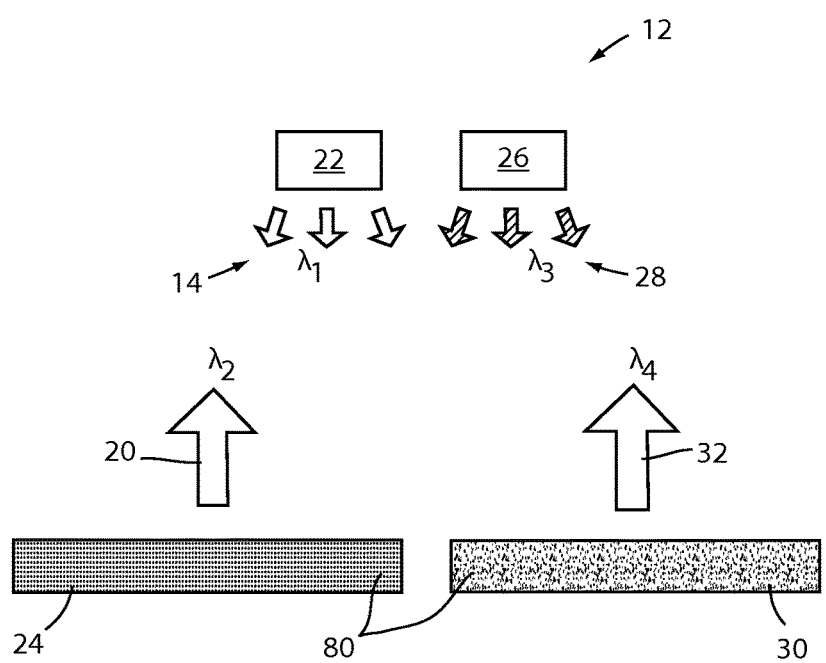
FIG. 4 is a side schematic view of a lighting system configured to convert a first excitation emission and a second excitation emission into a first output emission and a second output emission of light, respectively.

Referring now to FIGS. 3 and 4, the at least one light source 12, may refer to a plurality of light emitters including the first emitter 22 and the second emitter 26. The at least one light source 12 may also be referred to as an excitation source and is operable to emit at least the first excitation emission 14. The at least one light source 12 may comprise any form of light source, for example halogen lighting, fluorescent lighting, light emitting diodes (LEDs), organic LEDs (OLEDs), polymer LEDs (PLEDs), solid state lighting or any other form of lighting configured to output the first excitation emission 14.

In an exemplary implementation, the light source 12 comprises LEDs or groups of LEDs configured to emit the first excitation emission 14 and the second excitation emission 28. Each of the excitation emissions 14 and 28 may correspond to a blue, violet, and/or ultra-violet color range.

The blue spectral color range comprises a range of wavelengths generally expressed as blue light (~440-500 nm). In some implementations, the second wavelength $\lambda_2$ may comprise a wavelength in the ultraviolet or near ultraviolet color range (~100-450 nm). In an exemplary implementation, the first wavelength $\lambda_1$ may be approximately 470 nm and the second wavelength may be approximately 370 nm. Though particular wavelengths and ranges of wavelengths are discussed in reference to the wavelengths of the excitation emissions, the wavelengths may generally be configured to excite any photoluminescent material.

Referring now to FIG. 4, the lighting system 8 is shown in a configuration comprising a plurality of photoluminescent portions 80 including the first photoluminescent portion 24 and the second photoluminescent portion 30. The first photoluminescent portion 24 is configured to emit the first output emission 20 in response receiving the first excitation emission 14 from the first emitter 22. The second photoluminescent portion 30 may be configured to emit the second output emission 32 in response receiving the second excitation emission 28 from the second emitter 26. Each of the plurality of photoluminescent portions 80 may be excited substantially independently. For example, the first output emission 20 may be output while the second output emission 32 is inactive, and the second output emission 32 may be output while the first output emission 20 is inactive. This selective activation of each of the photoluminescent portions 80 may be implemented by utilizing photoluminescent materials having significantly non-overlapping luminescent absorption ranges.

In some implementations, the first excitation emission 14 from the first emitter 22 may be configured such that the first wavelength $\lambda_1$ corresponds to a first absorption range of the first photoluminescent portion 24. The second excitation emission 28 from the second emitter 26 may be configured such that the third wavelength $\lambda_3$ corresponds to a second absorption range of the second photoluminescent portion 30. The first absorption range may correspond to an absorption range that is substantially different than the second absorption range. In this configuration, the first emitter 22 may selectively activate the first photoluminescent portion 24 with the first excitation emission 14 in the first absorption range and the second emitter 26 may selectively activate the second photoluminescent portion 30 with the second excitation emission 28 in the second absorption range.

In an exemplary embodiment, the wavelengths of the first excitation emission 14 and the second excitation emission 28 may be configured to activate the first photoluminescent portion 24 and the second photoluminescent portion 30, substantially independently. The wavelength of the first excitation emission 14 may target a first absorption range of the first photoluminescent portion 24, and the wavelength of the second excitation emission 28 may target the second absorption range of the second photoluminescent portion 30. In this particular example, the material selected for the first photoluminescent portion 24 is configured to have the first absorption range, which corresponds to longer wavelengths of light than the second absorption range. In this way, the first photoluminescent portion 24 may be illuminated independent of the second photoluminescent portion 30. The absorption ranges and resulting emissions may be configured by the particular photoluminescent materials utilized in each of the photoluminescent portions 24 and 30.

The term absorption range as used herein defines a range of wavelengths that excite a photoluminescent portion or structure and cause a photoluminescent material to become excited. In response to the excitation, the photoluminescent portion emits an emission having at least one wavelength of light which is at least partially outside the absorption range. In various implementations, the absorption range of the photoluminescent materials as discussed herein may vary. Additionally, the emission of light in the form of emitted fluorescence may be selected based on the material properties of the photoluminescent structures discussed herein.

In an exemplary embodiment, the first absorption range may correspond to a range of wavelengths in blue and/or near UV range of light having wavelengths of approximately 390-450 nm. The second absorption range may correspond to a substantially non-overlapping range of wavelengths in the UV and/or blue range of light having wavelengths of approximately 250-410 nm. The first excitation emission 14 may be approximately 470 nm configured to cause the first photoluminescent portion 24 to output the first output emission 20 of approximately 525 nm. The second excitation emission 28 may be approximately 370 nm configured to cause the second photoluminescent portion 30 to output the second output emission 32 of approximately 645 nm. In this way, the first output emission 20 and the second output emission 32 may be selectively excited by each of the emitters 22, 26 to independently output a substantially green colored light and a substantially orange-red colored light, respectively.

In general, the photoluminescent materials of the first photoluminescent portion 24 and the second photoluminescent portion 30 may be combined in various proportions, types, layers, etc. to generate a variety of colors for the each of the output emissions. Though particular materials and structures of photoluminescent materials are discussed herein, various materials may be utilized without departing from the spirit of the disclosure. In some implementations, the first photoluminescent portion 24 is configured to have the first absorption range being substantially greater than the second absorption range. Additionally, the second wavelength $\lambda_2$ of the first output emission 20 may be configured to output a substantially shorter wavelength or range of wavelengths than the fourth wavelength $\lambda_4$ of the second output emission 32. For example, the first output emission 20 may correspond to a significantly different color of light than the second output emission 32.

In some implementations, the first photoluminescent portion 24 may comprise an organic fluorescent dye configured to convert the first excitation emission 14 to the first output emission 20. For example, the first photoluminescent material may comprise a photoluminescent structure of rylenes, xanthenes, porphyrins, phthalocyanines, or other materials suited to a particular Stoke shift defined by absorption range and emission fluorescence or output emission. The first photoluminescent portion 24 and corresponding material may be configured to have a shorter Stoke shift than the second photoluminescent portion 30. In this way, each of the photoluminescent portions 24 and 30 may be independently illuminated by the emitters 22 and 26 to output different colors of light.

The second photoluminescent portion 30 may comprise a photoluminescent structure 42 configured to generate a longer stoke shift than the first photoluminescent portion 24. The second photoluminescent portion 30 may comprise an organic or inorganic material configured to have the second absorption range and a desired output wavelength or color. In an exemplary embodiment, the photoluminescent structure 42 of the second photoluminescent portion 30 may be of at least one inorganic luminescent material selected from the group of phosphors. The inorganic luminescent material may more particularly be from the group of Ce-doped garnets, such as YAG:Ce. This configuration may provide for a second stoke shift of the second photoluminescent portion 30 to be longer than a first stoke shift of the first photoluminescent portion 24.

To achieve the various colors and combinations of photoluminescent materials described herein, the lighting system 8 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Pat. No. 9,057,021 to Kingsley et al., entitled "PHOTOLUMINESCENT OBJECTS," filed Mar. 6, 2014; and U.S. Pat. No. 9,493,699 to Agrawal et al., entitled "CHROMIC LUMINESCENT COMPOSITIONS AND TEXTILES," filed Apr. 17, 2014, all of which are incorporated herein by reference in their entirety.

Referring again to FIG. 1, the lighting system 8 may comprise a controller configured to selectively activate the first emitter 22 to emit the first excitation emission 14 and the second emitter 26 to selectively emit the second excitation emission 28. The controller may be configured to selectively activate the light source 12 in response to a variety of vehicle conditions and/or manual inputs from one or more user interfaces. The controller is discussed further in reference to FIG. 6. As demonstrated in FIG. 1, the lighting system 8, is configured to selectively activate each of the emitters 22 and 26 to selectively illuminate the photoluminescent portions 24 and 30 by emitting excitation emissions from the side mirror assembly 16.

Each of the emitters 22 and 26 of the light source 12 may correspond to one or more LEDs configured to selectively emit the excitation emissions 14 and 28 in response to a vehicle condition. The controller may be in communication with a vehicle control module such that the controller may control the emitters 22 and 26 in response to signals received from the vehicle control module. The signals from the vehicle control module may identify operating states or conditions of various systems of the vehicle 6. The controller may comprise one or more circuits and/or processors operable to control the emitters 22 and 26.

In some embodiments, the first photoluminescent portion 24 may be disposed on at least a portion of the first passenger door 36, and the second photoluminescent portion 30 may be disposed on at least a portion of the second passenger door 40. In response to receiving a signal identifying that the first passenger door 36 is ajar, the controller may activate the first emitter 22 to illuminate the first photoluminescent portion 24. In response to receiving a signal identifying that the second passenger door 40 is ajar, the controller may activate the second emitter 26 to illuminate the second photoluminescent portion 30. In this configuration, the lighting system 8 is operable to illuminate at least a portion of a door that is ajar and provide a visible notification to an onlooker of the vehicle 6. Additionally the controller may be operable to be utilized in combination with various additional systems to provide an audible warning of the door being ajar in addition to the visual warning.

In some embodiments, the vehicle 6 may also be equipped with at least one proximity sensor 124 configured to detect obstructions in a blind spot of the vehicle 6. As discussed herein, the blind spot may refer to a zone proximate the vehicle 6 that is not readily visible to an operator of the vehicle 6 via the side mirror assembly 16. In such implementations, the proximity sensor 124 may communicate a blind spot detection to the controller identifying that there is an obstruction, for example a passing vehicle, located in the blind spot. In response the blind spot detection, the controller may activate the first emitter 22 and/or second emitter 26 such that the first and/or second photoluminescent portions 24 and 30 may be illuminated. In this way, the system 8 is operable to illuminate at least a portion of a panel 10 of the vehicle 6.

In some embodiments, the controller may receive additional information and identifying signals from the vehicle control module via a communication bus. For example, the controller may be configured to receive a turn indication signal from the vehicle control module. In response to the turn indication signal, the controller may activate at least one of the emitters 22 and 26 to illuminate at least a portion of one of the panels 10. Additionally, in some embodiments, the controller may activate at least one of the emitters 22 and 26 in response to the blind spot detection in combination with the turn indication signal and/or a related identification that a steering angle of the vehicle 6 indicates a lane change. For example, the controller may be configured to illuminate the first photoluminescent portion 24 and/or the second photoluminescent portion 30 in response to receiving a combination of a turn indication signal and a blind spot detection signal from the at least one proximity sensor 124. In this way, the lighting system 8 may be operable to illuminate at least a portion of a surface of a panel 10 of the vehicle 6, for example the first passenger door 36, the second passenger door 40, a fender 94, and/or any portion of a panel of the vehicle 6. In some implementations, the portion of the surface of the panel 10 may correspond to a handle of at least one of the passenger doors 36 and 40. The surface of the panel 10 may also correspond to at least a portion of a badge or logo which may be configured to display a make, model, or style of the vehicle 6.

In yet another embodiment, the system 8 may further be operable to illuminate at least a portion of a front wheel 96 or a rear wheel 98 of the vehicle 6. Similar to each of the panels 10, the photoluminescent portions may be disposed on one or more of the wheels 96 and 98. In this configuration, the lighting system 8 may selectively activate each of the emitters 22 and 26 to illuminate one or more of the wheels 96 and 98 with the first output emission 20 or the second output emission 32. Each of the wheels 96 and 98 may comprise the first photoluminescent portion 24 and the second photoluminescent portion 30. In such implementations, the first emitter 22 and/or the second emitter 26 may be selectively activated such that the first excitation emission 14 and/or the second excitation emission excite illuminate at least one of the wheels 96 and 98 in the color of light corresponding to the first output emission 20, the second output emission 32, or any combination thereof.

For example, the controller may be operable to control an intensity or illumination level of the emitters 22 and 26 in response to a color control signal from the vehicle control module. The color control signal may be utilized to control the intensity of the first excitation emission 14 and the second excitation emission 28. The color control signal may correspond to a vehicle speed, turning rate, etc. In response to the color control signal changing, at least one of the wheels 96 and 98, having the first photoluminescent portion 24 and the second photoluminescent portion disposed thereon, may be illuminated in a first color corresponding to the first photoluminescent portion 24, a second color corresponding to the second photoluminescent portion 30, or any combination thereof.

The first photoluminescent portion 24 may be configured to output the first output emission 20 in a green color, and the second photoluminescent portion 30 may be configured to output the second output emission 32 in a red color. The controller may activate the first excitation emission 14 at a high level in response to the color control signal communicating that the vehicle 6 is traveling at a low speed (e.g. 0-20 km/h) to illuminate at least one of the wheels 96 and 98 in a green color. As the vehicle 6 increases in speed, the controller my decrease and intensity of the first excitation emission 14 and activate the second excitation emission 28 at a low level (e.g. 0-40 km/h). As the vehicle 6 continues to accelerate, the controller may decrease the intensity of the first excitation emission 14 and increase the intensity of the second excitation emission 28 until the first excitation emission 14 is deactivated when the vehicle 6 approaches a high speed (140 km/h). In this way, the system may illuminate the at least one wheel 96 and 98 in the first color, the second color, or a blend of colors therebetween.

Figure 5:
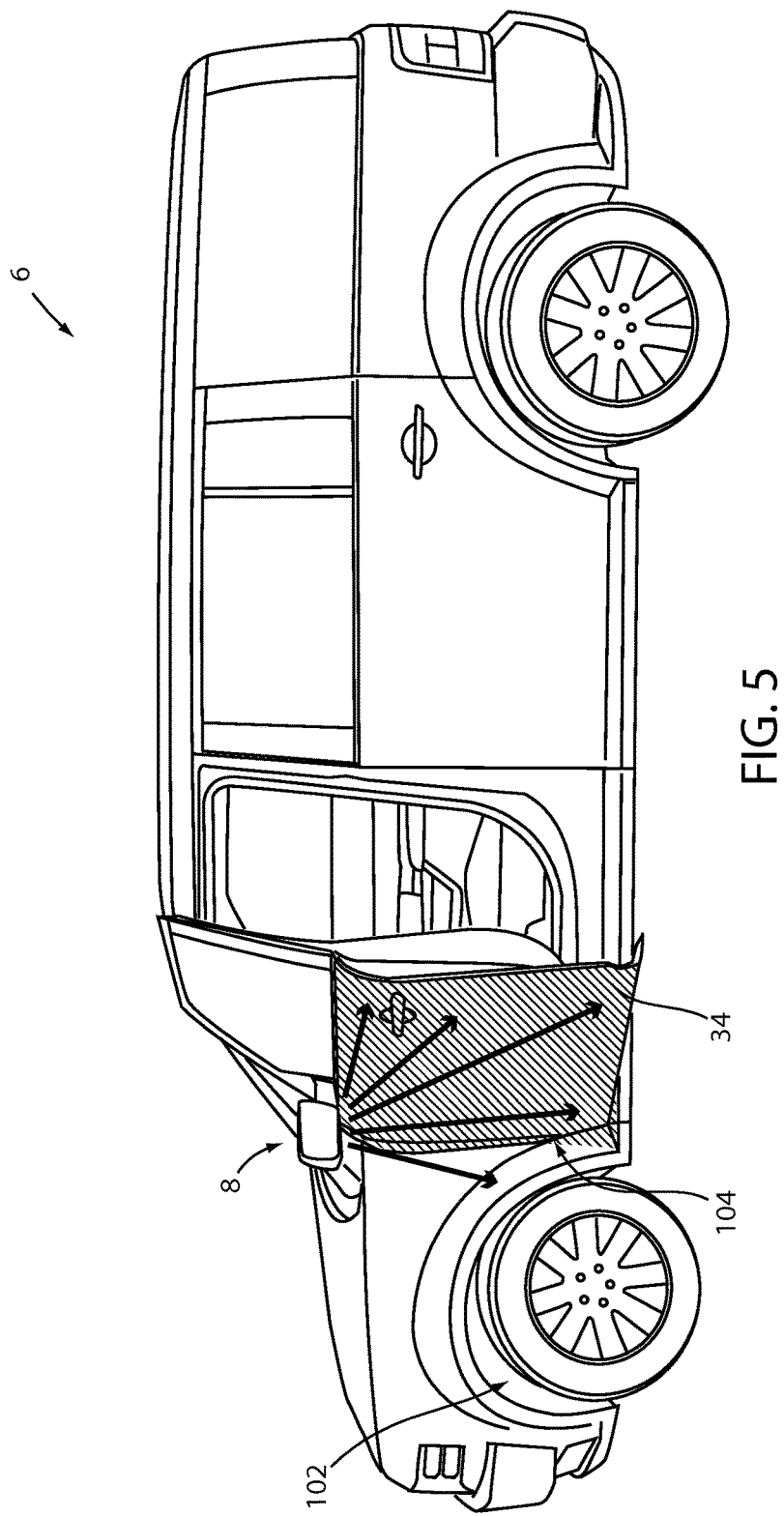
FIG. 5 is a side view of a vehicle comprising a lighting system operable to illuminate a surface of the vehicle to light a work area proximate the vehicle.

Referring now to FIG. 5, a side view of the vehicle 6 is shown having the first passenger door 36 oriented in an open configuration. In some implementations, the system 8 may further be operable to be manually activated. For example, as shown the lighting system 8 may selectively illuminate a wheel well 102 proximate the first passenger door 36 by exciting the first photoluminescent portion 24 to output the first output emission 20. The wheel well 102 may be illuminated by the controller by activating the first emitter 22 to output the first excitation emission 14. In response to receiving the first excitation emission 14, the first photoluminescent portion 24 may output the first output emission 20 such that the wheel well 102 is illuminated by the surface of the first passenger door 36 as a utility light. In some implementations, the first passenger door 36 may comprise an electrical or electromechanical switch 104 in communication with the controller operable to detect the door 34 oriented in the open configuration. The switch may be disposed proximate a hinge of the door 34. In this way, the system 8 provides for a utility light to illuminate at least one wheel well 102 of the vehicle 6. For clarity, some of the reference numerals are omitted from FIG. 5. Like bodies and assemblies may be referred using similar reference numerals.

Figure 6:
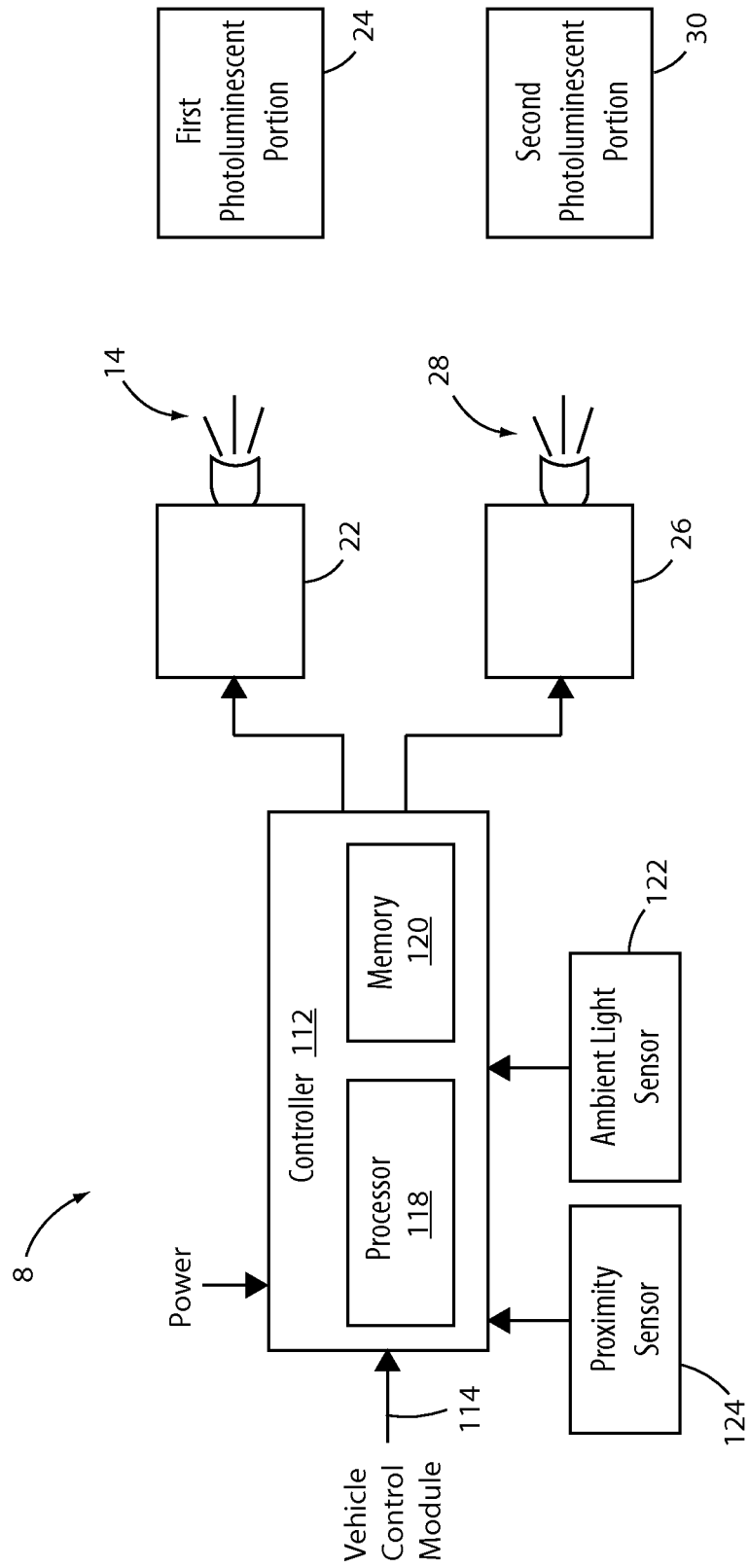
FIG. 6 is a block diagram of the lighting system of the vehicle in accordance with the disclosure.

Referring now to FIG. 6, a block diagram of the lighting system 8 demonstrating a controller 112 configured to control the illumination of the light source 12 to illuminate the photoluminescent portions 24, 30. The controller 112 may be in communication with a communication bus 114 of the vehicle 6. The communication bus 114 may be configured to deliver signals to the controller 112 identifying various vehicle states. For example, the communication bus 114 may be configured to communicate to the controller 112 a drive selection of the vehicle, an ignition state, a remote activation of the light source 12, or any other information or control signals that may be utilized to adjust the illumination of the lighting system 8. Additionally the controller 112 may be configured to receive at least one signal identifying a rate, intensity, and/or amplitude of each of the operating conditions. Such signals may be communicated to the controller 112 via various vehicle systems, for example, a tachometer, a temperature gauge, a speedometer, etc. In this configuration, the controller 112 of the lighting system 8 may be configured to generate a visual notification corresponding to an operating condition (e.g. the rate of engine operation, the engine temperature, the vehicle speed, a status of a turn indicator, etc.) by selectively illuminating the first emitter 22 and/or the second emitter 26 of the light source 12. In this configuration, the controller 112 is operable to selectively activate the first emitter 22 and the second emitter 26 to illuminate the first photoluminescent portion 24 and the second photoluminescent portion 30, substantially independently.

The controller 112 may comprise a processor 118 comprising one or more circuits configured to receive the signals from the communication bus 114 and output signals to control the light source 12 to emit the first excitation emission 14, the second excitation emission 28 and various combinations thereof. The processor 118 may be in communication with a memory 120 configured to store instructions to control the activation of the light source 12. The controller 112 may further be in communication with an ambient light sensor 122. The ambient light sensor 122 may be operable to communicate a light condition, for example a level brightness or intensity of the ambient light proximate the vehicle 6. In response to the level of the ambient light, the controller 112 may be configured to adjust a light intensity output from one or more emitters of each of the light sources 12. The intensity of the light output from the light source 12 may be adjusted by controlling a duty cycle, current, or voltage supplied to the light source 12.

The controller 112 may further be in communication with a proximity sensor 124. The proximity sensor may be disposed in the side mirror assembly 16 and configured to detect vehicles approaching the blind spot of the vehicle 6. The proximity sensor may be correspond to at least one ultrasonic sensor, electromagnetic sensor, an image based detection system, etc. Additionally, the controller 112 may be operable to detect a lane change of the 6 based on a steering angle received from a steering angle sensor via the communication bus 114. In this way, the controller 112 is operable to identify when the vehicle 6 may change lanes to output at least one warning indication via the illumination apparatus discussed herein.

The disclosure provides for a lighting system configured to illuminate at least a portion of a vehicle panel. In some embodiments, a plurality of emitters may be utilized to selectively illuminate a plurality of photoluminescent portions disposed on a surface of the vehicle. In this configuration, the lighting system 8 may be configured to selectively illuminate each of the photoluminescent portions corresponding to various vehicle conditions or states. The disclosure may provide for lighting systems configured to provide lighting to improve an appearance and add valuable features to a variety of vehicles. While the various implementations of the lighting system described herein refer to specific structures demonstrated in reference to at least one automotive vehicle, it will be appreciated that the lighting system may be utilized in a variety of applications.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
at least one light source disposed in a portion of a side mirror assembly and configured to emit an excitation emission at a first wavelength substantially along a side portion of the vehicle;
an exterior surface of a door panel comprising a photoluminescent portion, wherein the excitation emission is configured to excite the photoluminescent portion to emit an output emission corresponding to a different color of light than the excitation emission, wherein the photoluminescent portion is configured to illuminate a portion of a wheel well of the vehicle in response to the door panel oriented in a substantially open position; and
a controller configured to selectively illuminate the door panel in response to a cornering light indication and in response to the door panel being oriented in the substantially open position.

2. An illumination apparatus for a vehicle comprising:
at least one light source disposed in a portion of a side mirror assembly and configured to emit at least one excitation emission at a first wavelength substantially along a side portion of the vehicle in response to a door ajar condition; and
a forward door surface and a rear door surface comprising at least one photoluminescent portion comprising a first photoluminescent portion corresponding to the forward door surface and a second photoluminescent portion corresponding to the rear door surface, wherein the excitation emission is configured to excite the at least one photoluminescent portion to emit an output emission corresponding to a different color of light than the at least one excitation emission.

3. The illumination apparatus according to claim 2, wherein the light source is configured to selectively emit the at least one excitation emission as a first excitation emission or a second excitation emission.

4. The illumination apparatus according to claim 3, wherein the first excitation emission is configured to selectively excite the first photoluminescent portion.

5. The illumination apparatus according to claim 4, wherein the second excitation emission is configured to selectively excite the second photoluminescent portion.

6. The illumination apparatus according to claim 5, wherein the first excitation emission is configured to illuminate the first photoluminescent portion substantially independent of the second photoluminescent portion.

7. The illumination apparatus according to claim 5, further comprising a controller configured to selectively activate the first excitation emission in response to a door ajar condition of the forward door and the second excitation emission in response to a door ajar condition of the rear door.

* * * * *